United States Patent

Thapliyal et al.

(10) Patent No.: US 7,685,630 B2
(45) Date of Patent: Mar. 23, 2010

(54) METHODS AND SYSTEMS FOR PROVIDING SCALABLE AUTHENTICATION

(75) Inventors: Ashish V. Thapliyal, Santa Barbara, CA (US); Vishal Mittal, Santa Barbara, MA (US); Tony Spataro, Goleta, CA (US); John Kennedy, Los Olivos, CA (US)

(73) Assignee: Citrix Online, LLC, Santa Barbara, CA (US)

( * ) Notice: Subject to any disclaimer, the term of this patent is extended or adjusted under 35 U.S.C. 154(b) by 993 days.

(21) Appl. No.: 11/381,695

(22) Filed: May 4, 2006

(65) Prior Publication Data
US 2007/0261101 A1    Nov. 8, 2007

(51) Int. Cl.
*G06F 7/04*    (2006.01)
*G06F 15/16*   (2006.01)
*G06F 17/30*   (2006.01)
*G06F 29/06*   (2006.01)

(52) U.S. Cl. .................. 726/4; 726/5; 709/225
(58) Field of Classification Search .......... 726/4, 726/5; 709/225
See application file for complete search history.

(56) References Cited

U.S. PATENT DOCUMENTS

| | | | |
|---|---|---|---|
| 4,736,369 A | 4/1988 | Barzilai et al. | |
| 5,455,953 A | 10/1995 | Russell | |
| 5,491,750 A | 2/1996 | Bellare et al. | |
| 5,557,748 A | 9/1996 | Norris | |
| 5,564,016 A | 10/1996 | Korenshtein | |
| 5,586,260 A | 12/1996 | Hu | |
| 5,644,720 A | 7/1997 | Boll et al. | |
| 5,671,354 A | 9/1997 | Ito et al. | |
| 5,689,708 A | 11/1997 | Regnier et al. | |
| 5,745,573 A | 4/1998 | Lipner et al. | |
| 5,774,660 A | 6/1998 | Brendel et al. | |
| 5,787,175 A * | 7/1998 | Carter .................. 713/165 |
| 5,794,207 A | 8/1998 | Walker et al. | |
| 5,812,784 A | 9/1998 | Watson et al. | |
| 5,864,678 A | 1/1999 | Riddle | |
| 5,938,733 A | 8/1999 | Heimsoth et al. | |
| 5,951,694 A | 9/1999 | Choquier et al. | |
| 5,958,009 A | 9/1999 | Friedrich et al. | |
| 5,987,611 A | 11/1999 | Freund | |

(Continued)

FOREIGN PATENT DOCUMENTS

EP    1351467    10/2003

(Continued)

OTHER PUBLICATIONS

Silja Mäki, Tuomas Aura, and Maarit Hietalahti. "Robust membership management for ad-hoc groups". In Proc. 5th Nordic Workshop on Secure IT Systems (NORDSEC 2000), Reykjavik, Iceland, Oct. 2000.*

(Continued)

*Primary Examiner*—Michael J Simitoski
(74) *Attorney, Agent, or Firm*—Goodwin Procter LLP

(57) ABSTRACT

Methods and systems of authenticating a plurality of users for access to an on-line group activity are described. The systems and methods prevent overloading of any participant's computer due to authentication. In some configurations, multiple endpoints are designated as authenticators and requests for authentication are load balanced amongst the authenticators.

33 Claims, 5 Drawing Sheets

U.S. PATENT DOCUMENTS

| | | | |
|---|---|---|---|
| 6,023,722 | A | 2/2000 | Colyer et al. |
| 6,038,596 | A | 3/2000 | Baldwin et al. |
| 6,055,564 | A | 4/2000 | Phaal |
| 6,058,480 | A | 5/2000 | Brown |
| 6,199,113 | B1 | 3/2001 | Alegre et al. |
| 6,256,739 | B1 | 7/2001 | Skopp et al. |
| 6,266,418 | B1 | 7/2001 | Carter et al. |
| 6,272,632 | B1 | 8/2001 | Carman et al. |
| 6,308,281 | B1 | 10/2001 | Hall, Jr. et al. |
| 6,393,484 | B1 | 5/2002 | Massarani |
| 6,523,027 | B1 | 2/2003 | Underwood |
| 6,567,813 | B1 | 5/2003 | Zhu et al. |
| 6,601,233 | B1 | 7/2003 | Underwood |
| 6,606,708 | B1 | 8/2003 | Devine et al. |
| 6,606,744 | B1 | 8/2003 | Mikurak |
| 6,609,128 | B1 | 8/2003 | Underwood |
| 6,629,081 | B1 | 9/2003 | Cornelius et al. |
| 6,633,878 | B1 | 10/2003 | Underwood |
| 6,671,818 | B1 | 12/2003 | Mikurak |
| 6,691,232 | B1 | 2/2004 | Wood et al. |
| 6,704,873 | B1 | 3/2004 | Underwood |
| 6,711,409 | B1 * | 3/2004 | Zavgren et al. ............ 455/445 |
| 6,718,535 | B1 | 4/2004 | Underwood |
| 6,826,696 | B1 | 11/2004 | Chawla et al. |
| 6,850,252 | B1 | 2/2005 | Hoffberg |
| 7,035,240 | B1 * | 4/2006 | Balakrishnan et al. ...... 370/338 |
| 7,051,036 | B2 | 5/2006 | Rosnow et al. |
| 7,065,500 | B2 | 6/2006 | Singh et al. |
| 7,069,234 | B1 | 6/2006 | Cornelius et al. |
| 7,100,195 | B1 | 8/2006 | Underwood |
| 7,124,101 | B1 | 10/2006 | Mikurak |
| 7,130,807 | B1 | 10/2006 | Mikurak |
| 7,167,844 | B1 | 1/2007 | Leong et al. |
| 7,225,244 | B2 | 5/2007 | Reynolds et al. |
| 7,231,657 | B2 | 6/2007 | Honarvar et al. |
| 2002/0055989 | A1 * | 5/2002 | Stringer-Calvert et al. .. 709/220 |
| 2002/0129134 | A1 * | 9/2002 | Leighton et al. ............ 709/223 |
| 2002/0129135 | A1 * | 9/2002 | Delany et al. ............... 709/223 |
| 2002/0143944 | A1 * | 10/2002 | Traversat et al. ............ 709/225 |
| 2002/0198992 | A1 | 12/2002 | Stutz et al. |
| 2004/0073512 | A1 | 4/2004 | Maung |
| 2004/0111639 | A1 | 6/2004 | Schwartz et al. |
| 2004/0264697 | A1 * | 12/2004 | Gavrilescu et al. .......... 380/255 |

FOREIGN PATENT DOCUMENTS

| | | |
|---|---|---|
| EP | 1385311 A2 | 1/2004 |
| WO | WO-99/35783 | 7/1999 |
| WO | WO-03/050706 | 6/2003 |

OTHER PUBLICATIONS

Gong, Li. "Enclaves: Enabling Secure Collaboration over the Internet", 1996.*

Bechler, M. et al. "A Cluster-Based Security Architecture for Ad Hoc Networks", 2004.*

Amoretti et al (2005) "Introducing Secure Peergroups in SP2A," Hot Topics in Peer-to-Peer Systems, Hot-P2P 2005, Second International Workshop on San Diego, CA, pp. 62-71.

International Search Report and Written Opinion for corresponding PCT Application No. PCT/US07/010759 mailed Oct. 25, 2007 (13 pages).

Gong, "Using One-Way Functions For Authentication," ACM SIGCOMM Computer Communication Review archive, vol. 19, Issue 5, Oct. 1989, pp. 8-11.

Neuman, "Proxy-Based Authorization and Accounting for Distributed Systems", Proceedings of the International Conference on Distributed Computing Sysstems, US, Los Alamitos, IEEE Comp. Soc. Press, May 25, 1993, pp. 283-291.

Otway et al. "Efficient And Timely Mutual Authentication," ACM SIGOPS Operating Systems Review archive, vol. 21, Issue 1, Jan. 1987, pp. 8-10.

Paulson, "Mechanized Proofs For A Recursive Authentication Protocol," Proceedings of the Computer Security Foundations Workshop, 1997, Issue 10-12, Jun. 1997, pp. 84-94.

Ryan et al., "An Attack On A Recursive Authentication Protocol. A Cautionary Tale," Information Processing Letters archive, vol. 65, Issue 1, Jan. 1998, pp. 7-10.

* cited by examiner

METHODS AND SYSTEMS FOR PROVIDING SCALABLE AUTHENTICATION

FIELD OF THE INVENTION

The present invention relates to authentication in a computing environment. More specifically, the invention relates to providing scalable authentication in a distributed computing environment.

BACKGROUND OF THE INVENTION

In a large collaboration conducted via computers connected to networks, such as a webinar or on-line meeting, ensuring end-to-end security requires that each end-user (participant) be authenticated in an end-to-end fashion. The authentication cannot be done by the underlying infrastructure otherwise the end-users must trust the underlying infrastructure which is usually operated by a third party. This leads to the problem of scalability since one participant's computer resources are usually insufficient to authenticate a large number of participants in a reasonable amount of time.

SUMMARY OF THE INVENTION

In one aspect, the invention prevents overloading of any participant's computer due to authentication. To achieve this multiple endpoints are designated as authenticators and requests for authentication are load balanced amongst the authenticators. Some of the advantages include, but are not limited to, preventing the overloading of any authenticator, and preventing the overloading of the infrastructure of the distributed computing system. Additionally, authentication is nearly as fast as the underlying protocol used for end-to-end authentication. The invention supports using secure authentication protocols such as Secure Remote Password (SRP). Also, in some embodiments authenticators are protected from denial of service attacks via authentication.

In one embodiment, the invention features a method of authenticating a plurality of users for access to an on-line group activity. The method includes assigning a first authenticator for the on-line group activity and promoting another member of the plurality of users to an authenticator after being authenticated by the first authenticator.

In one embodiment, promoting includes determining that more authenticators are needed and promoting one of the plurality of users in response to that determination. In further embodiments, the determinations occurs on at least one of a periodic basis or at a random time interval.

In additional embodiments, the determination that one or more authenticators are needed includes determining that the number of authenticators does not exceed a predetermined threshold. In yet another embodiment, the determination that one or more authenticators are needed includes determining that the number of authenticators is less than a ratio of authenticators to the number of participants or the number of members of the on-line group activity requesting authentication by the first authenticator exceeds a predetermined threshold.

In still another embodiment, determining occurs responsive to an event. Examples of events include the addition of a participant and authenticator transitioning to an idle status.

In other embodiment, the promoting occurs when the number of members of the on-line group activity requesting authentication by the first authenticator exceeds a predetermined threshold. In some embodiments promoting includes selecting a random one of the members authenticated by the first authenticator, sending a message to a plurality of the users and promoting the first user to respond to the message, and sending a message to a plurality of the user and promoting the last user to respond to the message.

In another aspect, the invention features a system for authenticating a plurality of users for access to an on-line group activity The system includes a server and a promoter. The server assigns a first authenticator for the on-line group activity. The authenticator is one of the plurality of users. The promoter promotes another member of the plurality of users to an authenticator after being authenticated by the first authenticator.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
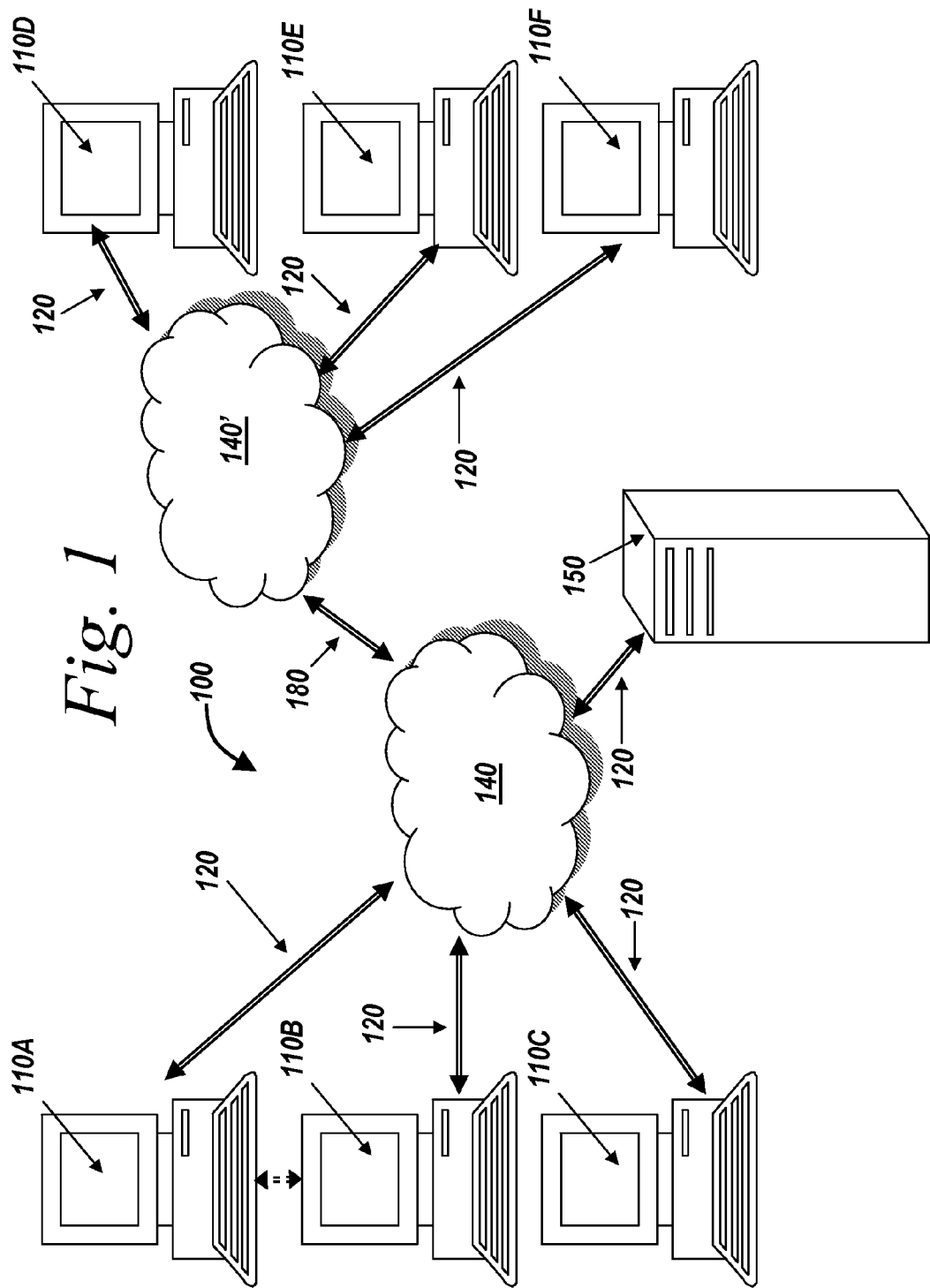
FIG. 1 shows an embodiment of distributed computing environment.

With reference to FIG. 1, a distributed computing environment 100, which can be used for on-line collaboration and the like, includes one or more participant computing devices 110A, 110B, . . . , 110F (hereinafter each participant computing device or plurality of computing devices is generally referred to as participant 110) are in communication with one or more server computing devices 150 (hereinafter each server computing device or plurality of computing devices is generally referred to as server 150) via a communications network 140. Although FIG. 1, depicts an embodiment of a distributed computing environment 100 having participants 110 and a servers 150, any number of participants 110 and servers 150 may be provided. For example, there may be only participants 110 and no servers 150 (e.g., an ad hoc peer-to-peer network).

The participant 110 can be any personal computer, server, Windows-based terminal, network computer, wireless device, information appliance, RISC Power PC, X-device, workstation, minicomputer, personal digital assistant (PDA), main frame computer, cellular telephone or other computing device that provides sufficient faculties to execute participant software and an operating system. Participant software executing on the participant 110 provides, alone or in combination with other software modules, the ability to determine, by a participant, which authenticator to authenticate against, determine that there is a sufficient number of authenticators are present within the distributed computing environment 100 and determine which participant 100 to make an authenticator.

The server 150 can be any type of computing device that is capable of communication with one or more participants 110.

For example, the server 150 can be a traditional server computing device, a web server, an application server, a DNS server, or other type of server. In addition, the server 150 can be any of the computing devices that are listed as participant devices. In addition, the server 150 can be any other computing device that provides sufficient faculties to execute server software and an operating system. Server software executing on the server 150 provides the functionality, alone or in combination with other software modules, the ability determine that there is a sufficient number of authenticators are present within the distributed computing environment 100 and determine which participant 100 to make an authenticator.

The network 140 can be a local-area network (LAN), a medium-area network (MAN), or a wide area network (WAN) such as the Internet or the World Wide Web. In another embodiment, the network 140 can be a peer-to-peer network or an ad-hoc wireless network. Users of the participants 110 connect to the network 140 via communications link 120 using any one of a variety of connections including, but not limited to, standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, and direct asynchronous connections).

In other embodiments, the participants 110 communicate with the server 150 through a second network 140', through a communication link 180 that connects network 140 to the second network 140'. The protocols used to communicate through communications link 180 can include any variety of protocols used for long haul or short transmission. For example, TCP/IP, IPX, SPX, NetBIOS, NetBEUI, SONET and SDH protocols. The combination of the networks 140, 140' can be conceptually thought of as the Internet. As used herein, Internet refers to the electronic communications network that connects computer networks and organizational computer facilities around the world.

The participants 110 can communicate directly with each other in a peer-to-peer fashion or through the server 150. For example, in some embodiments a communication server 150 facilitates communications among the participants 110. The server 150 provides a secure channel using any number of encryption schemes to provide secure communications among the participants. In one embodiment, different channels carry different types of communications among the participants 110 and the server 150. For example in an on-line meeting environment, a first communication channel carries screen data from a presenting participant 110 to the server 150, which, in turn, distributes the screen data to the other participants 110. A second communications channel is shared, as described in more detail below, to provide real-time, low-level or low-bandwidth communications (e.g., chat information, electronic business cards, contact information, and the like) among the participants.

Figure 2:
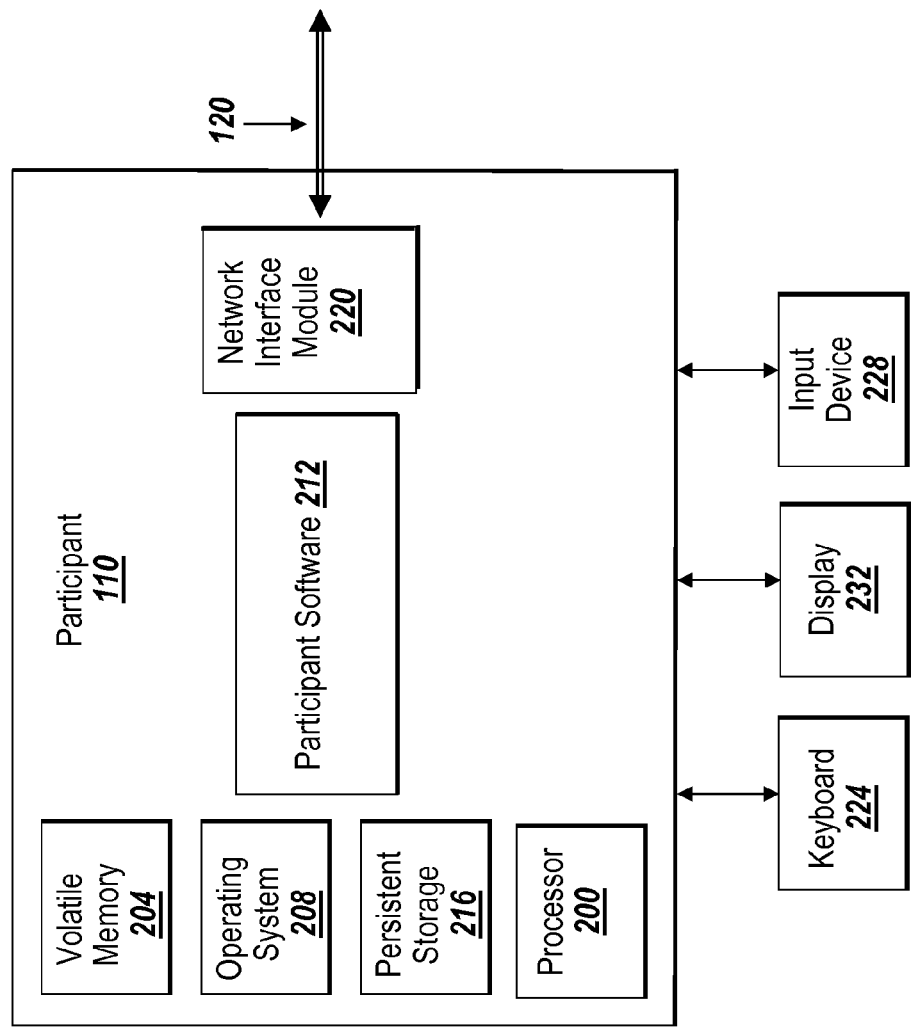
FIG. 2 shows an embodiment of a participant computing device of the distributed computing environment of FIG. 1.

FIG. 2 depicts a conceptual block diagram of a participant 110. It should be understood that other embodiments of the participant 110 can include any combination of the following elements or include other elements not explicitly listed. In one embodiment, each participant 110 typically includes a processor 200, volatile memory 204, an operating system 208, participant software 212, a persistent storage memory 216 (e.g., hard drive or external hard drive), a network interface 220 (e.g., a network interface card), a keyboard 224 or virtualized keyboard in the case of a PDA, at least one input device 228 (e.g., a mouse, trackball, space ball, light pen and tablet, touch screen, stylus, and any other input device) in electrical communication with the participant 110, and a display 232. The operating system 116 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS SERVER 2003, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 116 can run on a virtualized computing machine implemented in software using virtualization software such as VMWARE.

The participant software 212 is in communication with various components (e.g., the operating system 208) of the participant 110. As a general overview, the participant software 212 promotes other participants to authenticators. In some embodiments, the participant software 212 determines if additional authenticators are needed and determines which other participant to promote as an authenticator. In other embodiments, the participant software determines which authenticator to authenticate against and performs the authentication process. Additionally, the participant software 212 provides denial of service (DOS) protection for an authenticator. The participant software 212 limits the number of concurrent authentication requests an authenticator can service.

Figure 3:
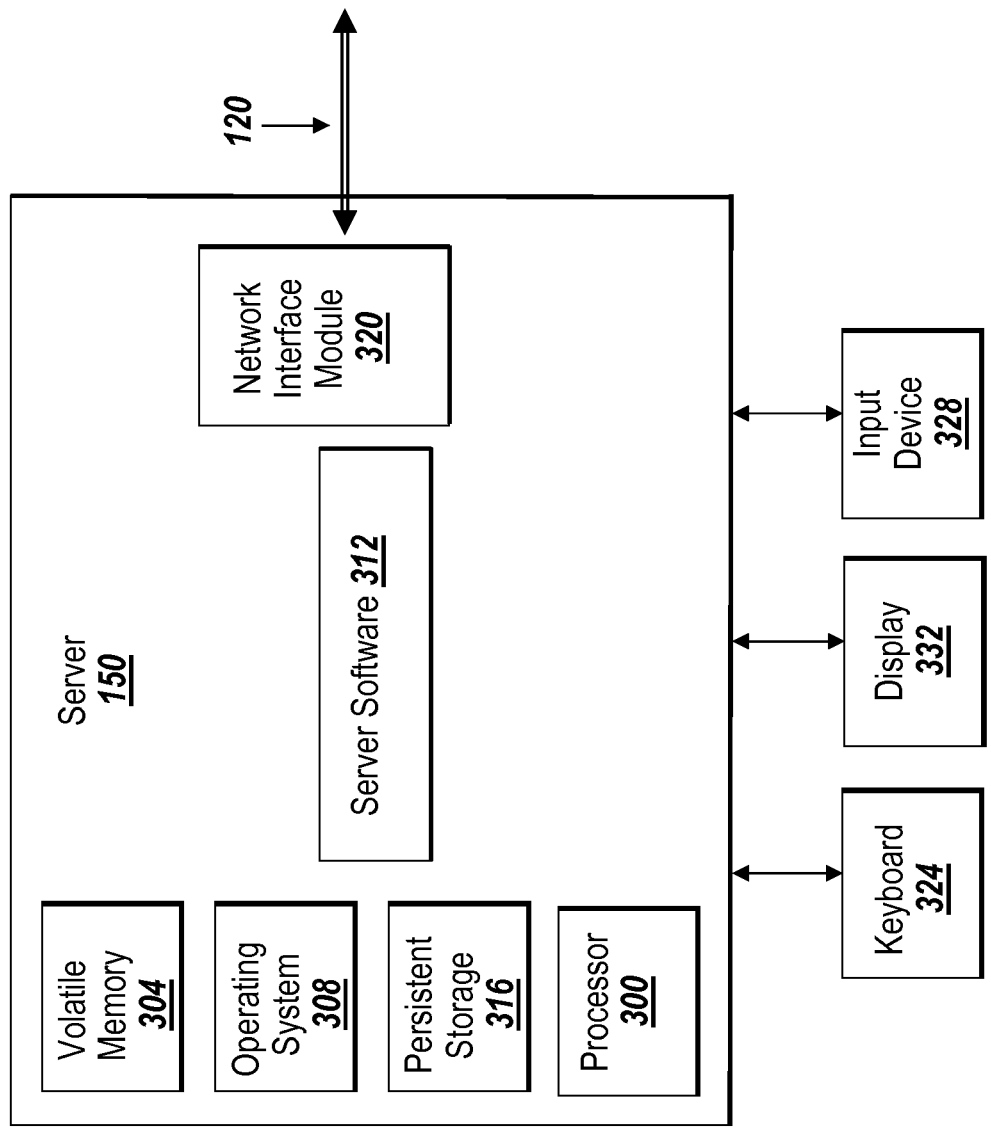
FIG. 3 shows an embodiment of a server computing device of the distributed computing environment of FIG. 1.

With reference to FIG. 3, an embodiment of a server 150 is described. It should be understood that other embodiments of the server 150 can include any combination of the following elements or include other elements not explicitly listed. The server 150 includes a processor 300, a volatile memory 304, an operating system 308, server software 312, persistent storage memory 316, a network interface 320, a keyboard 324, at least one input device 328 (e.g., a mouse, trackball, space ball, bar code reader, scanner, light pen and tablet, stylus, and any other input device), and a display 332. In one embodiment, the server 150 operates in a "headless" mode. The server operating system can include, but is a not limited to, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, JAVA, PALM OS, SYMBIAN OS, LINSPIRE, LINUX, SMARTPHONE OS, the various forms of UNIX, WINDOWS 2000 SERVER, WINDOWS SERVER 2003, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 116 can run on a virtualized computing machine implemented in software using virtualization software such as VMWARE.

The server software 312 is in communication with various components (e.g., the operating system 308) of the server 150 to provide features of the invention. As a general overview, the server software 312 determines the first authenticator. In some embodiments, the server software 312 can also determine if additional authenticators are needed.

Figure 4:
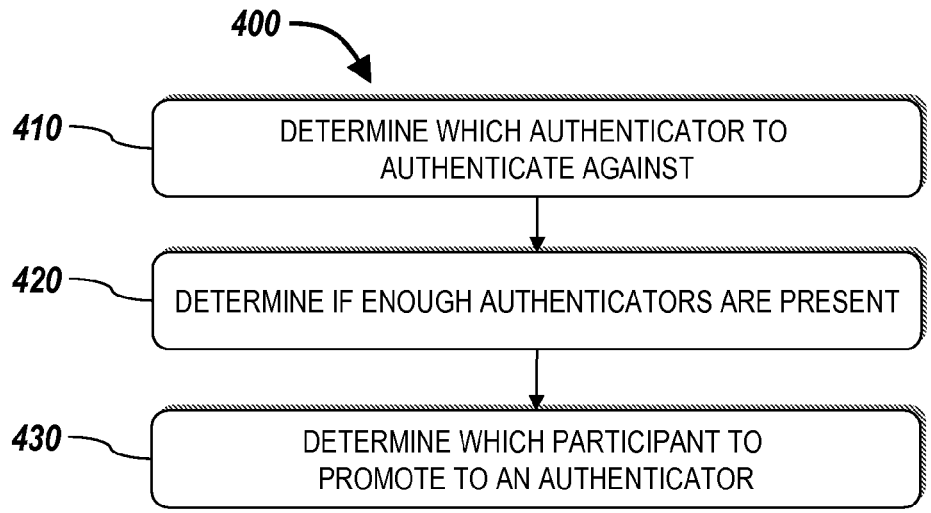
FIG. 4 is a flow chart of a embodiment of a method of providing scalable authentication according to principles of the invention.

With reference to FIG. 4, an operational overview of certain aspects of the invention is described. In one embodiment, a method 400 of operation includes 1) determining (STEP 410), by a participant 110, which authenticator to authenticate against, 2) determining (STEP 420) that there is a sufficient number of authenticators are present within the distributed computing environment 100 and 3) determining (STEP 430) which participant 110 to make an authenticator and performing the necessary set-up operations after selection.

Figure 5:
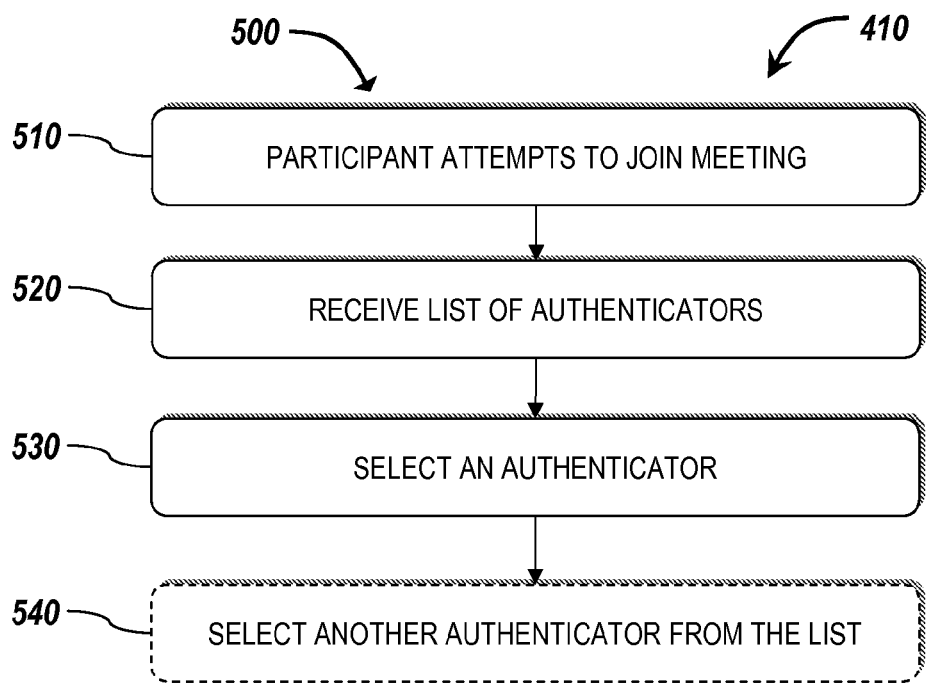
FIG. 5 is a flow chart depicting an embodiment of a method of selecting an authenticator against which to authenticate.

With reference to FIG. 5, an embodiment of a method 500 of determining which authenticator a participant 110 of the on-line collaboration environment should authenticate itself against (STEP 410) is described. A participant 110 attempts (STEP 510) to join the on-line meeting. In response, the participant 110 receives (STEP 520) a list of authenticators and selects (STEP 530) an authenticator from the list. If the authentication fails the participant 110 optionally selects (STEP 540) another authenticator from the list of authenticators.

Still referring to FIG. 5, and in greater detail, the participant 110 attempts (STEP 510) to join the on-line meeting by providing a website address to a browser. In another embodiment, the participant 110 issues a "join" request to a server 150 of the distributed computing environment. In yet another embodiment, the participant 110 issues a "join" request to another participant 110 of the on-line meeting.

In one embodiment, the participant 110 receives (STEP 520) the list of known authenticators from the server 150. In another embodiment, from another one of the participants 110 of the on-line meeting. In yet another embodiment, the participant 110 receives the list of know authenticators from a designated holder of the list.

In one embodiment, the participant 110 selects (STEP 530) a random one of the authenticators in the list to authenticate against to gain access to the online meeting. In another embodiment, the participant 110 uses a deterministic approach to select which authenticator to authenticate against. For example, an algorithm which load balances amongst the available authenticators, such as choosing the $k^{th}$ authenticator (arranged in ParticipantId order), where k represents the ParticipantId of the participant 110 modulo with the total number of available authenticators. Expressed mathematically, the equation can be represented as chosen authenticator=((participantID) mod (total number of authenticators)).

In another embodiment, the participant 110 "pings" a number of authenticators and chooses the one that responds the quickest to authenticate against. In another embodiment, the participant 110 starts authenticating concurrently to multiple authenticators, and stop once any one of the authenticators authenticates the participant 110.

If the authentication process does not complete for any number of reasons (e.g., a time-out occurs and the like), the participant 110 can choose (STEP 540) another authenticator to authenticate against. In one embodiment, the first authenticator is marked as unable to authenticate and is excluded from the selection of the next authenticator to authenticate against. In one embodiment, a random one of the authenticators in the list is selected to authenticate against to gain access to the online meeting. In another embodiment, the participant 110 uses a deterministic approach to select which authenticator to authenticate against. In another embodiment, the participant 110 "pings" a number of authenticators and chooses the one that responds the quickest to authenticate against. In another embodiment, the participant 110 starts authenticating concurrently to multiple authenticators, and stop once any one of the authenticators authenticates the participant 110.

Figure 6:
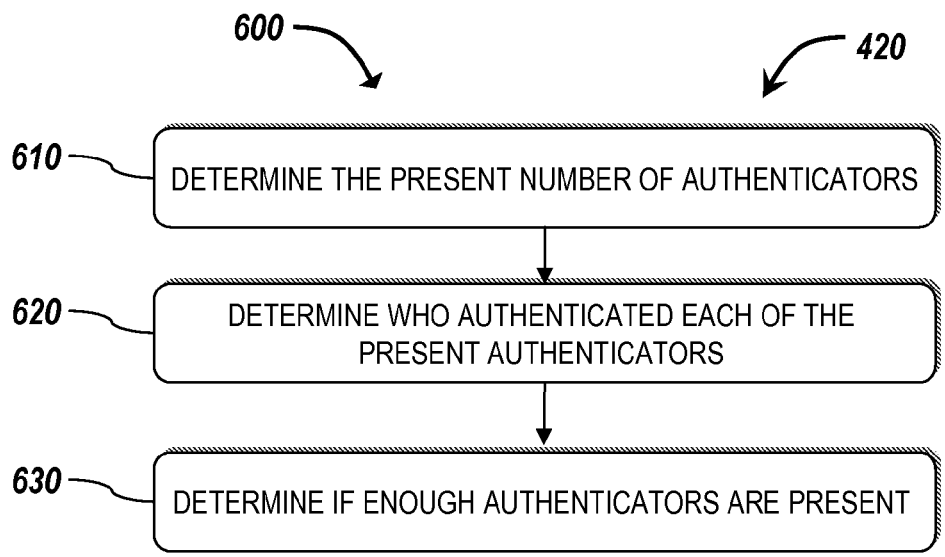
FIG. 6 is a flow chart depicting an embodiment of a method of determining if there is a sufficient number of authenticators.

With reference to FIG. 6, an embodiment of a method 600 of determining (STEP 420) if there is a sufficient number of authenticators present to service the number of authentication requests. In one embodiment, the method 600 includes determining (STEP 610) the actual number of authenticators present in the distributed computing environment 100, determining (STEP 620) who authorized the promotion of each of the present authenticators, and determining (STEP 630) if there is a sufficient number of authenticators.

In one embodiment, a list of authenticators is kept by one or more participants 110 or the server 150 and used to determine (STEP 610) the actual number of authenticators present in the distributed computing environment 100. In another embodiment, a running total of the number authenticators of the distributed computing environment 100 is kept by at least one of the participants 110.

In one embodiment, determining (STEP 620) who promoted the participant 110 occurs by storing data about the promotion process. For example, when a participant 110 becomes an authenticator and is added to the list of authenticators data describing who authorized or promoted the authenticator is stored in the list as well. In another embodiment, a separate list of the authenticators that promoted or authorized the promotion of a participant 110 is kept.

Various method can be applied to determine (STEP 630) that there are enough authenticators. In one embodiment, it is assumed that there is never enough authenticators in the distributed computing environment 100; therefore, each participant 110 is promoted to an authenticator to ensure that there is the maximum number of authenticators. In another embodiment, the happening of an event triggers the determination (STEP 630) if there is a sufficient number of authenticators. Examples of events can include, but are not limited to, the addition of a participant, the subtraction of an authenticator, the completion of a participant 110 being authenticated, an authenticator leaving the on-line activity, and an authenticator's status transitioning to idle.

In some embodiments, each time there is an event each participant 110 is required execute a test to determine if there is a sufficient number of authenticators. In another embodiment, only a subset of the participants 110 makes the determination. One method to ensure a portion of the participants 110 performs the determination is to use a fractional subset selection algorithm. The algorithm guarantees that only a fraction of the participants 110 performs the test. In one embodiment, the algorithm includes choosing a random number, by each participant 110, on the interval [0,1] of the real line. If the chosen number is less than a static threshold or a dynamic threshold then the participant 110 performs the test. This ensures that only a fraction of the participants 110 perform the test. In other words, this algorithm provides for the selection of a fraction (on average) of a set of participants 110 by running a local algorithm at each participant 110.

In yet another embodiment, the determining (STEP 630) that there is a sufficient number of authenticators is done on a periodic basis by at least one participant 110. In one embodiment, only a single participants 110 performs the determination each time period. For example, assume that the required number of authenticators is given by the following pseudo code:

```
ReqdAuthenticatorCount is given by:
    if ( size <= 11 ) {
        count = 1+ size / 3;
    } else if ( size <= 100 ) {
        count = 4 + ( size / 10 );
    } else {
        count = 12 + ( size / 50 );
    }
```

Where size is equal to the number of active participants 110.

Using a polling algorithm which helps reduce the load on the infrastructure of the distributed computing environment 110 by ensuring that on average only one authenticator out of the set of authenticators performs the determination that there is a sufficient number of authenticators every "TestInterval" amount of time. In one embodiment, the polling algorithm is specified as follows: Poll(NumPollers, TestInterval, TestAndDesignate( )).

Referring back to FIG. 4, when it is determined that additional authenticators are needed, numerous methods can be used to determine (STEP 430) which of the one or more participants 110 executes the steps necessary to become an authenticator. In one embodiment, a participant 110 decides to promote itself to an authenticator and performs the required setup. In another embodiment, an existing authenticator decides to promote a select participant 110 to an authenticator. The authenticator adds the participant 110 to the set of authenticators. The designated participant 110 for promotion determines that its name was added to the set of authenticators and performs the required setup. The designate participant 110 can monitor a list of known authenticators by polling that list or by events generated when the list of authenticators is updated.

In another embodiment, the authenticators 110 "pings" a number of participants 110 and chooses the participant 110 that responds the quickest to promote to authenticator. In another embodiment, the authenticator starts promoting multiple participants 110 concurrently, and stop once any one of the participants 110 completes the promotion setup.

One exemplary implementation of the described invention is used in an on-line collaboration product to perform on-line meetings or webinars. An on-line meeting consists of one or more participants 110 that communicate through a communication server 150. It should be understood that multiple communications server 150 can used if the number of participants 110 (also referred to a first organizer, which is the participant authorized to create and/or start a meeting) require more than a single communication server 150. In an webinar, the first participant 110 to join the webinar is designated as an authenticator by the server 150. As additional participants 110 request authentication to attend the webinar, the authentication requests are serviced by the first participant 110. As the number of requests for authentication grows, additional participants 110 that were previously authenticated are promoted to authenticators using the above-described principles.

There are numerous on-line collaboration products that can operate in the distributed computing environment 100. Exemplary products include, but are not limited to GOTOMEETING and GOTOWEBINAR offered by Citrix Online, LLC of Santa Barbara Calif. Certain aspects and features described below can be embodied in such a product. Other products include WEBEX EMX, WEBEX ENTERPRISE EDITION, WEBEX EVENT CENTER, WEBEX GLOBALWATCH, WEBEX MEETING CENTER, WEBEX MEETMENOW, WEBEX PRESENTATION STUDIO, WEBEX SALES CENTER, WEBEX TRAINING CENTER, WEBEX WEBOFFICE, AND WEBEX WORKSPACE offered by WebEx Communications, Inc. of Santa Clara Calif. Also included is LIVEMEETING offered by Microsoft Corporation of Redmond, Wash.

The previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

Although the present invention has been described with reference to specific details, it is not intended that such details should be regarded as limitations upon the scope of the invention, except as and to the extent that they are included in the accompanying claims.

What is claimed is:

1. A method of authenticating a plurality of user computing devices for access to an on-line group activity, the method comprising:
    (a) establishing, by a server computing device, a first authenticator for the on-line group activity, the authenticator being one of the plurality of user computing devices;
    (b) determining, by one of the plurality of user computing devices, that more authenticators are needed, the determining comprising determining that the number of authenticators does not exceed a predetermined threshold; and
    (c) promoting, by one of the plurality of user computing devices and in response to step (b), a member of the plurality of user computing devices to an authenticator after the member is authenticated, wherein the promoted member is able to communicate with and authenticate other user computing devices.

2. The method of claim 1 wherein execution of the determining step occurs on a periodic basis.

3. The method of claim 1 wherein execution of the determining step occurs at a random time interval.

4. The method of claim 1 wherein the determining is performed by a randomly selected authenticator on a periodic basis.

5. The method of claim 1 wherein the determining is performed by a randomly selected authenticator on a random basis.

6. The method of claim 1 wherein the determining that more authenticators are needed further comprises determining that the number of members of the on-line group activity requesting authentication by the first authenticator exceeds a predetermined threshold.

7. The method of claim 1 wherein execution of the determining step occurs responsive to an event.

8. The method of claim 7 wherein the determining step occurs in response to the addition of a participant.

9. The method of claim 7 wherein the determining step occurs in response to an authenticator having an idle status.

10. The method of claim 7 wherein the determining step occurs in response to an authenticator leaving the on-line group activity.

11. The method of claim 7 wherein the determining step occurs in response to a status change of an authenticator.

12. The method of claim 1 wherein the promoting occurs when the number of members of the on-line group activity requesting authentication by the first authenticator exceeds a predetermined threshold.

13. The method of claim 1 wherein the promoting comprises selecting a random one of the members authenticated by the first authenticator.

14. The method of claim 1 wherein the promoting comprises sending a message to a plurality of the users computing devices and promoting one of the users computing devices that responds to the message.

15. The method of claim 14 wherein the promoting comprises promoting the first user computing device to respond to the message.

16. The method of claim 14 wherein the promoting comprises promoting the last user computing device to respond to the message.

17. The method of claim 1 wherein the promoting is performed by the first authenticator.

18. A system for authenticating a plurality of users for access to an on-line group activity, the system comprising:
- a server computing device, comprising a processor, that determines a first authenticator for the on-line group activity, the authenticator being one of the plurality of users;
- a determination module that determines that more authenticators are needed when the number of authenticators does not exceed a predetermined threshold; and
- a promoter that promotes, in response to the determination module's determination, a member of the plurality of users to an authenticator after the member is authenticated, wherein the promoted member is able to communicate with and authenticate other users.

19. The system of claim 18 wherein the determination module operates on a periodic basis.

20. The system of claim 18 wherein the determination module operates at a random time interval.

21. The system of claim 18 wherein the determination module's determining is performed by a randomly selected authenticator on a periodic basis.

22. The system of claim 18 wherein the determination module's determining is performed by a randomly selected authenticator on a random basis.

23. The system of claim 18 wherein the determination module further determines that more authenticators are needed when the number of members of the on-line group activity requesting authentication by the first authenticator exceeds a predetermined threshold.

24. The system of claim 18 where in the determination module operates in response to an event.

25. The system of claim 24 wherein the event is the addition of a participant.

26. The system of claim 24 wherein the event is the transition of an authenticator to idle status.

27. The system of claim 24 wherein the event is an authenticator leaving the on-line group activity.

28. The system of claim 24 wherein the event is a status change of an authenticator.

29. The system of claim 18 wherein the promoter promotes another user when the number of members of the on-line group activity requesting authentication by the first authenticator exceeds a predetermined threshold.

30. The system of claim 18 wherein the promoter promotes a random one of the members authenticated by the first authenticator.

31. The system of claim 18 wherein the promoter includes a transmitter that transmits a message to a plurality of the users and the promoter promotes one of the users that responds to the message.

32. The system of claim 31 wherein the promoter promotes the first user to respond to the message.

33. The system of claim 31 wherein the promoter promotes the last user to respond to the message.

* * * * *